United States Patent
Kubo

(10) Patent No.: US 6,724,472 B2
(45) Date of Patent: Apr. 20, 2004

(54) LIGHT MONITORING DEVICE

(75) Inventor: Akio Kubo, Kamakura (JP)

(73) Assignee: Ushikata Mfg. Co., Ltd., Tokyo (JP)

( * ) Notice: Subject to any disclaimer, the term of this patent is extended or adjusted under 35 U.S.C. 154(b) by 0 days.

(21) Appl. No.: 10/047,214

(22) Filed: Jan. 14, 2002

(65) Prior Publication Data

US 2003/0133101 A1 Jul. 17, 2003

(51) Int. Cl.⁷ .................................................. G01J 1/04
(52) U.S. Cl. ...................................... 356/236; 356/218
(58) Field of Search ................................ 356/236, 218, 356/121, 222, 225

(56) References Cited

U.S. PATENT DOCUMENTS

| | | | | |
|---|---|---|---|---|
| 3,344,703 A | * | 10/1967 | Milton | .......................... 356/73 |
| 4,540,281 A | * | 9/1985 | Akiyama | ..................... 356/325 |
| 4,842,404 A | * | 6/1989 | Duda | .......................... 356/218 |
| 4,883,953 A | * | 11/1989 | Koashi et al. | ............... 250/226 |
| 5,076,663 A | * | 12/1991 | Arendt et al. | ............... 359/884 |
| 5,703,691 A | * | 12/1997 | Klaras et al. | ................ 356/437 |

FOREIGN PATENT DOCUMENTS

JP    02001272272 A   * 10/2001

* cited by examiner

*Primary Examiner*—Hoa Q. Pham
(74) *Attorney, Agent, or Firm*—David O'Reilly

(57) ABSTRACT

Object: provide an accurate monitor of light of even intensity light. Construction: A beam splitter (4) being fixed on a base (1) in the path of a main beam (2) of a light system, a reflecting mirror (5) being fixed on a side of the beam splitter (4), an inlet 6a of an integrating sphere (6) is provided at an opposite side of the beam splitter (4), and a light sensor (8) is provided at a reflecting surface of the integrating sphere (6).

3 Claims, 3 Drawing Sheets

LIGHT MONITORING DEVICE

FIELD OF THE INVENTION

This invention relates to light monitors for such as a $CO_2$ laser light.

BACKGROUND DESCRIPTION OF RELATED ART

Heretofore, such a light monitor detects a part of the light by a sensor. It is necessary to attenuate the level of light to be in the range of the sensor. For this purpose, laser light is reflected by a rough surface or net surface. However, an uneven variation (i.e., mottle) in the level of light due to the reflected part is large. Attenuation by a slit or iris produces an uneven variation of light due to the interference diffraction of light.

SUMMARY DESCRIPTION OF THE INVENTION

This invention intends to eliminate these drawbacks, and an object of this invention is to provide a light monitor in which the light is attenuated to provide even light without any mottling and is able to monitor or measure light accurately by a device that is simple and small in construction.

One embodiment of this invention is a light monitor in which a beam splitter 4 is fixed on a base 1 in main beam 2 of a light system, a reflecting mirror 5 is fixed on a side of beam splitter 4, and inlet 6a of an integrating sphere 6 is provided at an opposite side of beam splitter 4. Light sensor 8 is provided at the reflecting surface of integrating sphere 6 in which main beam 2 is effectively attenuated by the reflection in beam splitter 4, mirror 5 and integrating sphere 6 and becomes even intensity light by multiple reflections in integrating sphere 6 for accurate monitoring.

This invention is also a light monitor in which movable reflector 7 is provided that is movable along the reflecting surface of integrating sphere 6.

This invention is also a light monitor in which beam splitter 4 is fixed on base 1 in a main beam 2 of a light system, reflected light from beam splitter 4 enters integrating sphere 6 when the attenuation rate is large and light sensor 8 is provided at the reflecting surface of integrating sphere 6.

This invention is also a light monitor in which a visible light system is provided in main beam 2 light system and visible light 11 superimposes with said main beam 2 for observation.

The above and other objects, advantages and novel features of this invention will be more fully understood from the following detailed description and the accompanying drawings, in which like reference numbers indicate like or similar parts throughout wherein;

DETAILED DESCRIPTION OF THE PREFERRED EMBODIMENTS

Figure 1:
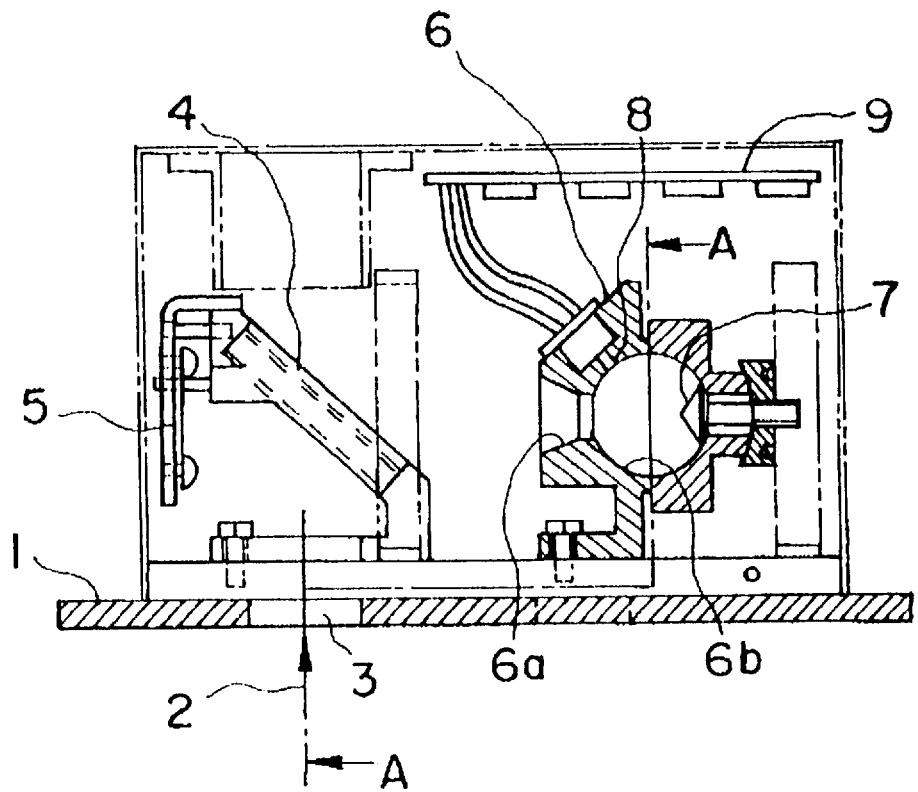
FIG. 1 is a longitudinal cross section of a first embodiment of this invention.
Figure 2:
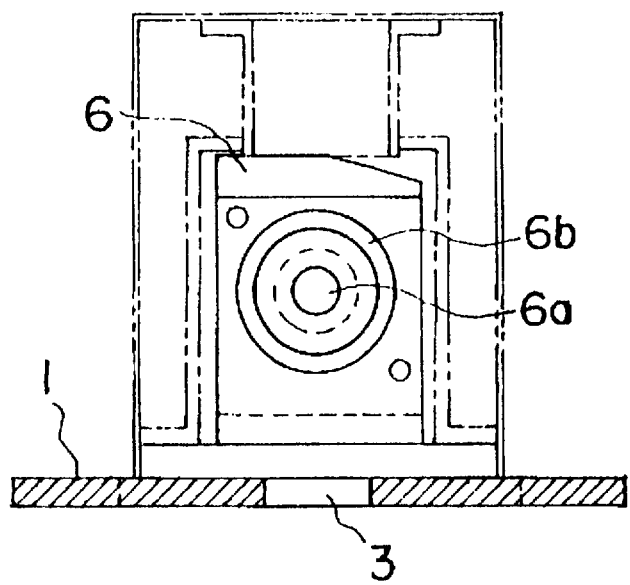
FIG. 2 is a right side view along A—A line in FIG. 1.
Figure 3:
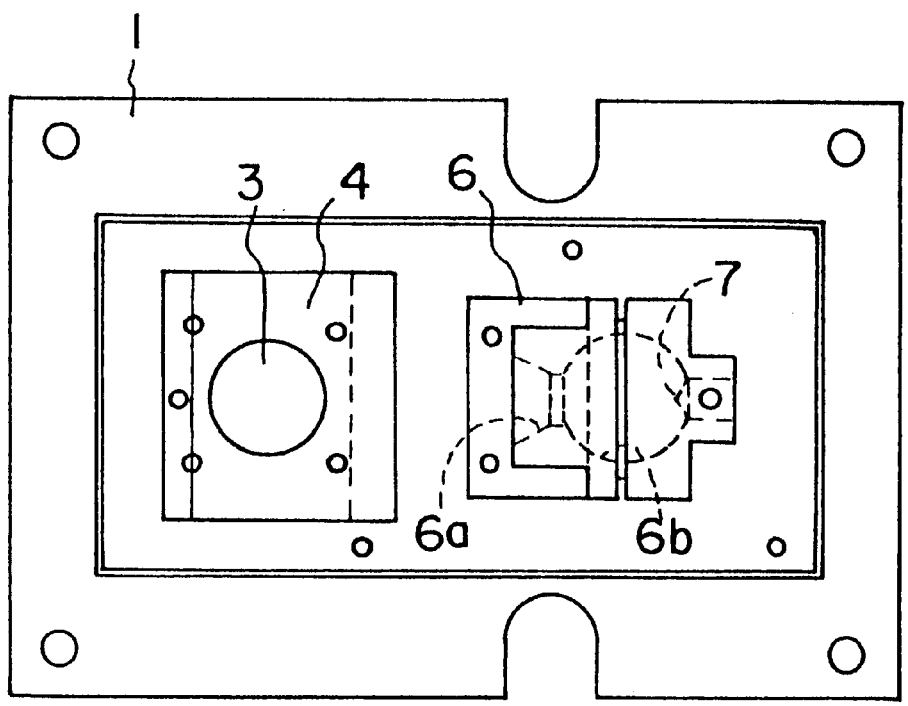
FIG. 3 is a plan view of this embodiment.

First Embodiment:

As shown in FIG. 1, base 1 has aperture 3 for passing main beam 2 from a laser tube. Above aperture 3, beam splitter 4 such as half mirror is fixed at 45° degrees inclination against beam 2. A usual plain mirror of reflection prism may be used as the half mirror. At the left side of beam splitter 4, plain mirror 5 is fixed in a perpendicular direction against the reflected light of beam splitter 4. At the right side of the beam splitter 4, inlet 6a of integrating sphere 6 (attenuating of light into even light) is provided and conical reflector 7 is provided in the inner reflecting sphere surface 6b movable along the surface for adjusting the intensity. Light sensor 8 is provided at a part of the inner reflecting sphere surface 6b. Electronic circuit plate 9 is for measuring an electronic signal.

Beam splitter 4 might return a part of the laser light to the laser tube and this is not preferable, therefore, the direction or inclination of the beam splitter 4 is a little offset from 45° degrees. In this case, plain mirror 5 is also offset from a perpendicular direction so as to direct light to inlet 6a of integrating sphere 6. If the attenuation by integrating sphere 6 is large, reflected light may be directly returned to the integrating sphere 6.

Operations of the device are as follows:

Main beam 2 from a laser tube enters beam splitter 4, a part of the light reflects off plain mirror 5 and returns to beam splitter 4 and inlet 6a of integrating sphere 6, the beam is attenuated and will be even light without mottling by the multiple reflections. Part of the light enters light sensor 8 and is changed into an electronic signal and measured by electronic circuit plate 9.

As explained above, a part of main beam 2 is attenuated and changed into an even intensity light without mottling by multiple reflections in beam splitter 4 and plain mirror 5 so as to be within the range of a light sensor and is adjusted by reflector 7 along a reflecting surface so as to be a proportional intensity light at the light sensor, therefore, it is possible to measure accurately.

Figure 4:
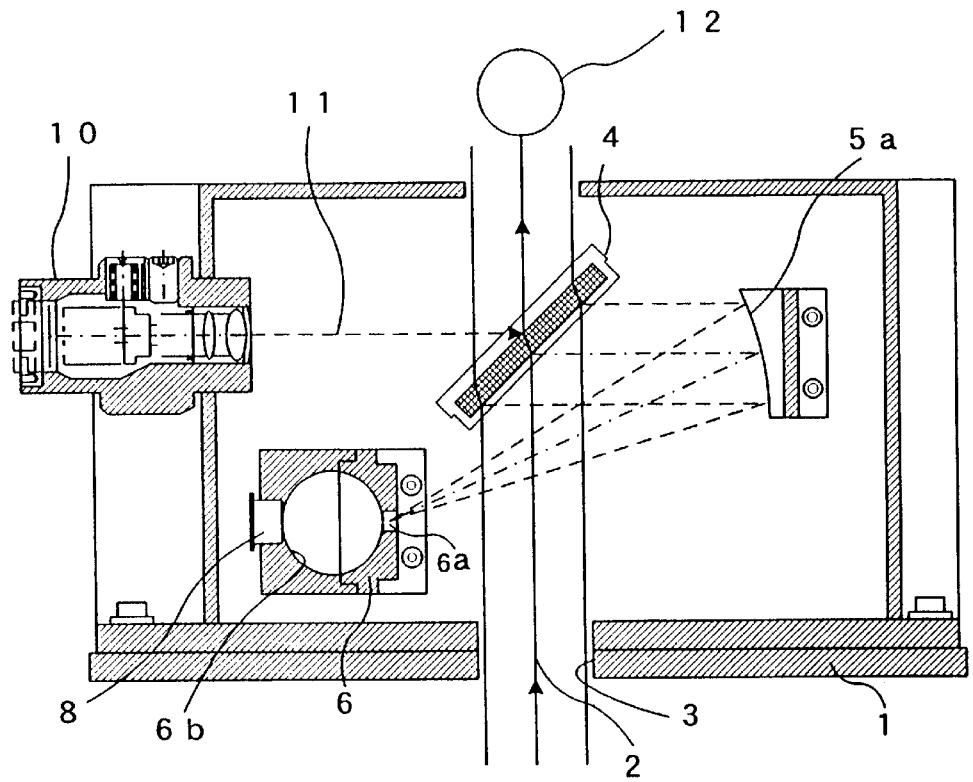
FIG. 4 is a longitudinal cross section of the second embodiment of this invention.
Figure 5:
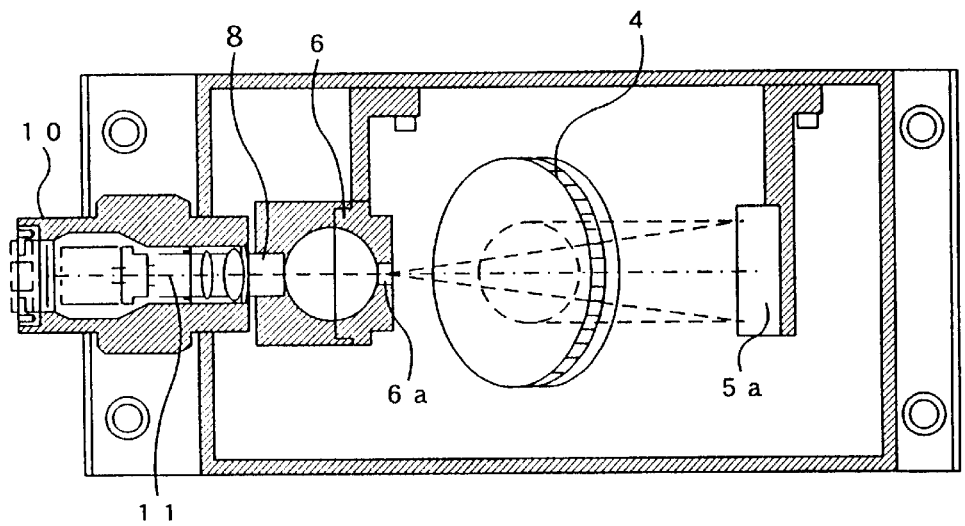
FIG. 5 is a plan view of this second embodiment.

Second embodiment:

FIGS. 4, 5 the second embodiment of this invention the same numerals are used for the same parts as in the first embodiment.

In this second embodiment, reflector 7 in integrating sphere 6 is eliminated and a visible light system is employed for observation when the main beam is invisible. Beam splitter 4, such as a half mirror fixed at 45° degrees inclination, is provided in front of aperture 3 for passing main beam 2. The usual plain mirror of a reflection prism may be used as the half mirror. At the right side of beam splitter 4, concave mirror 5a is fixed. Visible light 11 crosses with main beam 2 at the focus point of concave mirror 5a. Inlet 6a of integrating sphere 6 (attenuating of light in even light) is provided on a side of said beam splitter 4 opposite reflecting mirror 5a. Thus inlet 6a of integrating sphere 6 is on the opposite side of main beam 2 from concave mirror 5a. Light sensor 8 is provided at a part of the inner reflecting sphere surface 6b.

Visible light system from laser emission 10 is provided at the left end of base 1 and enters beam splitter 4. In beam splitter 4, visible light 11 is superimposed with passed beam 2 and enters target 12.

Operations of the device are as follows:

Main beam 2 from a laser tube enters beam splitter 4, a part of the light reflects toward plain mirror 5 and returns to beam splitter 4 and inlet 6a of integrating sphere 6. The beam is attenuated and will be even light without mottling by multiple reflections. A part of the light enters light sensor 8 and is changed into an electronic signal and measured by electronic circuit plate 9. Superimposed light of visible light 11 and main beam 2 enter target 12 and enables observation by a human eye.

Obviously many modifications and variations of the invention are possible in light of the above teachings and it is therefore, to be understood, that the full scope of the invention is not limited to the details disclosed herein, but only by the claims appended hereto, and may be practiced otherwise and as specifically described.

What is claimed is:

1. A light monitoring system for measuring light comprising;
    a beam splitter (4) fixed in a box (1) in the path of a main beam (2);
    a reflecting mirror (5) on one side of said beam splitter (4) for reflecting light received from said beam splitter (4);
    an integrating sphere (6) having an inlet (6a) and a reflecting surface (6b) for receiving light reflected from said reflecting mirror (5), said integrating sphere (6) being on a side of said main beam (2) opposite said reflecting mirror (5); and
    a light sensor (8) in said integrating sphere for receiving reflected light passing through said integrating sphere inlet (6a);
    whereby optimized light can be monitored and accurately measured.

2. The light monitoring system according to claim 1 including;
    a visible light emitter (10), light from said visible light emitter (10) being superimposed on light from said main beam (2) passing through said beam splitter (4); and a target (12) receiving said light from said main beam with superimposed light from said visible light emitter (10); whereby observation of said main beam (2) superimposed with said visible light emission (10) is enabled.

3. The light monitoring system according to claim 2 in which said reflecting mirror (5) is a concave mirror (5a) positioned for receiving and reflecting an optimized proportion of light from said main beam (2) superimposed with said visible light (10) from said beam splitter (4) into said inlet (6a) of said integrating sphere (6); whereby accurate monitoring is achieved.

* * * * *